Figure 61:
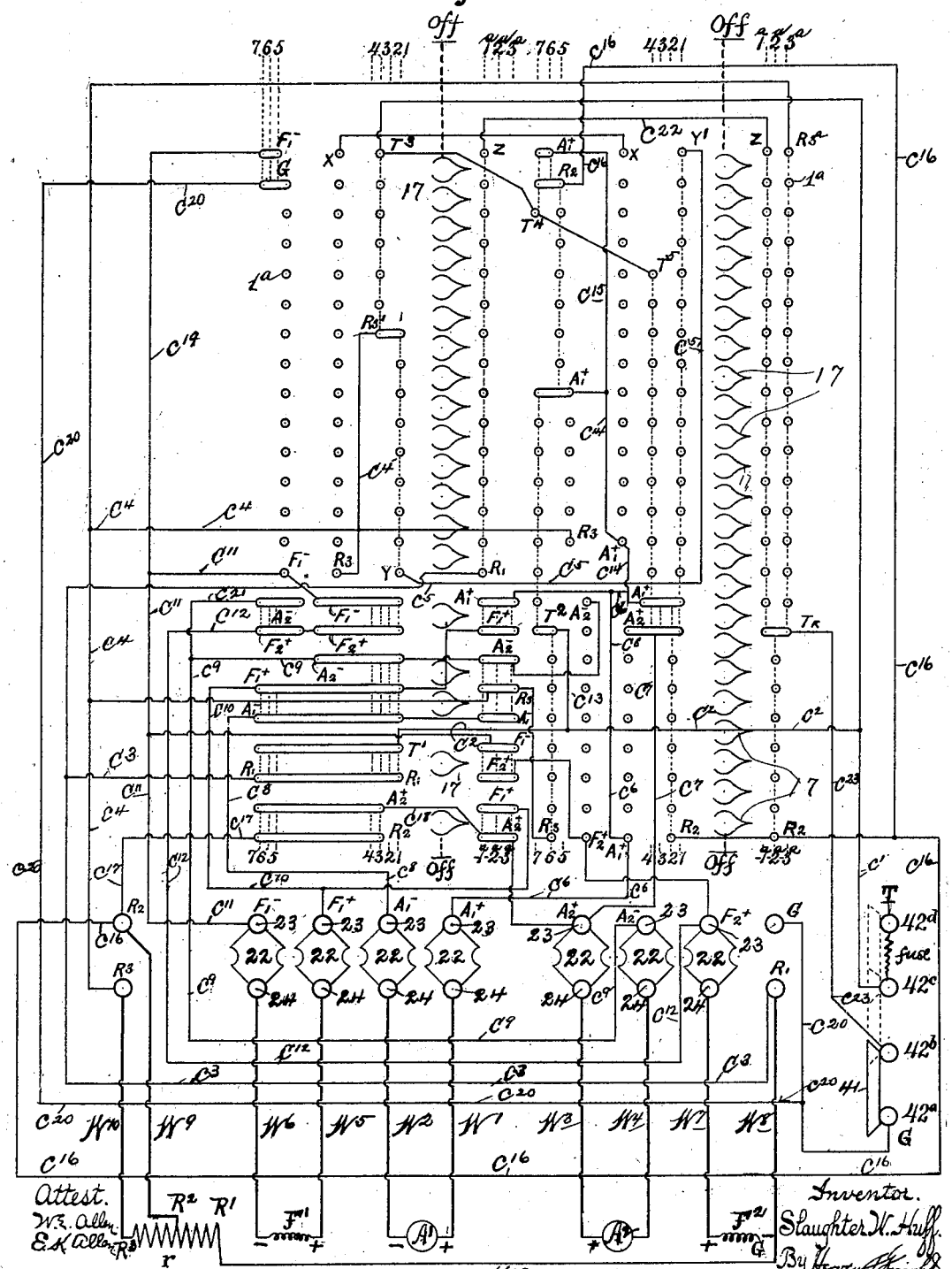

No. 653,087. Patented July 3, 1900.
S. W. HUFF.
ELECTRIC CONTROLLER.
(Application filed July 12, 1898. Renewed June 9, 1900.)
(No Model.) 8 Sheets—Sheet 1.
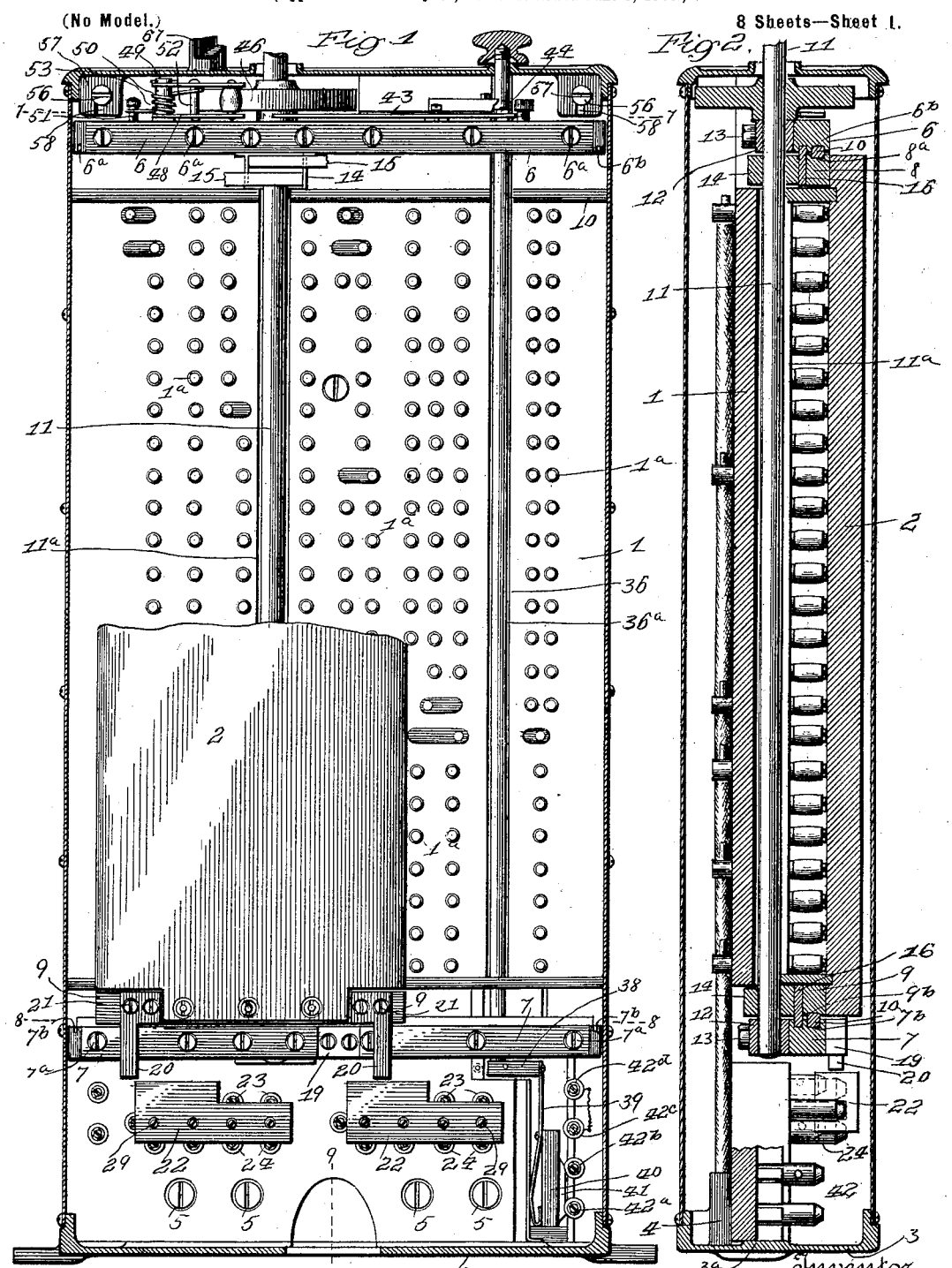
Witnesses
Herbert Bradley
Edward K. Allen
Inventor
Slaughter W. Huff.
By Hervey S. Knight
Attorney
THE NORRIS PETERS CO., PHOTO-LITHO., WASHINGTON, D. C.

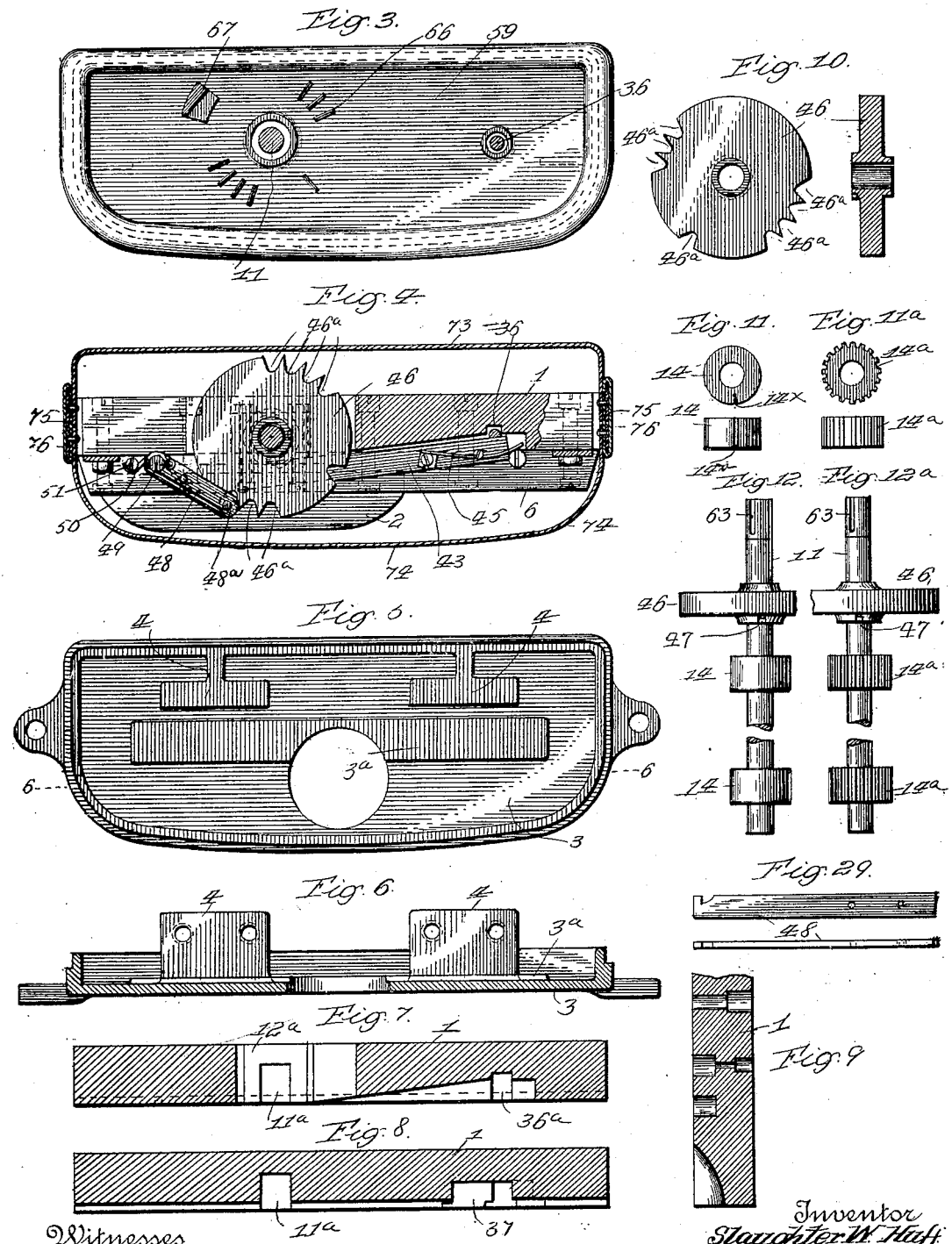

No. 653,087. Patented July 3, 1900.
S. W. HUFF.
ELECTRIC CONTROLLER.
(Application filed July 12, 1898. Renewed June 9, 1900.)
(No Model.) 8 Sheets—Sheet 3.
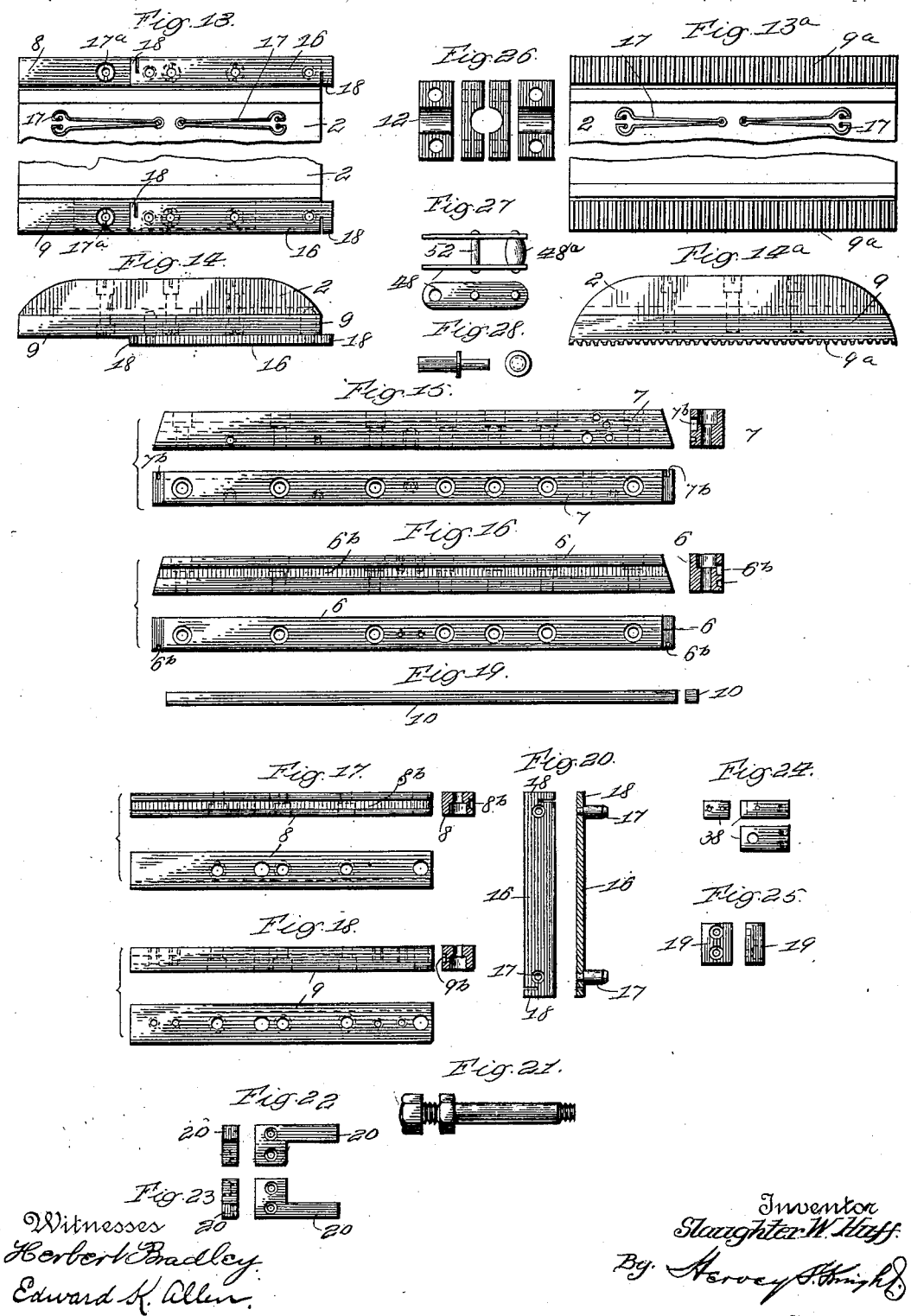

No. 653,087. Patented July 3, 1900.
S. W. HUFF.
ELECTRIC CONTROLLER.
(Application filed July 12, 1898. Renewed June 9, 1900.)
(No Model.) 8 Sheets—Sheet 4.
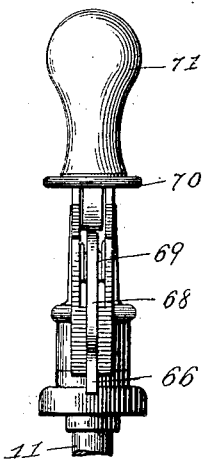
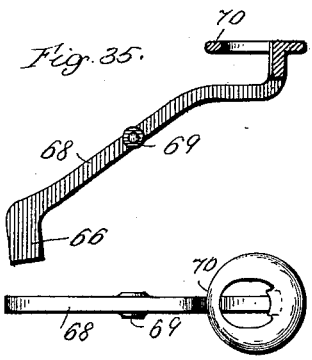
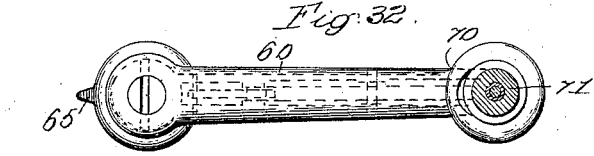
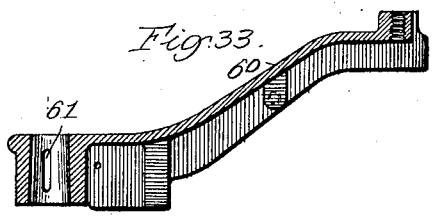
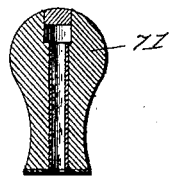
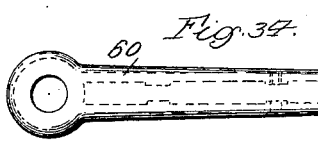
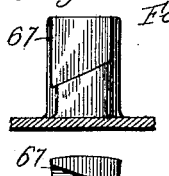
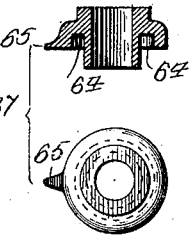

No. 653,087. Patented July 3, 1900.
S. W. HUFF.
ELECTRIC CONTROLLER.
(Application filed July 12, 1898. Renewed June 9, 1900.)
(No Model.) 8 Sheets—Sheet 5.
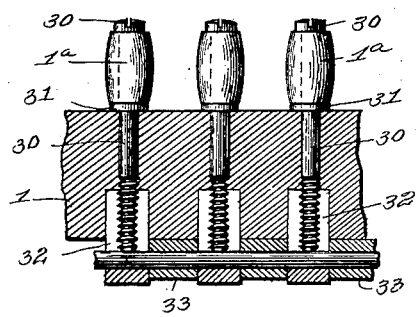
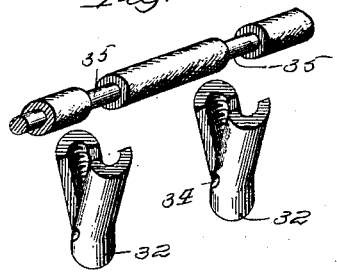
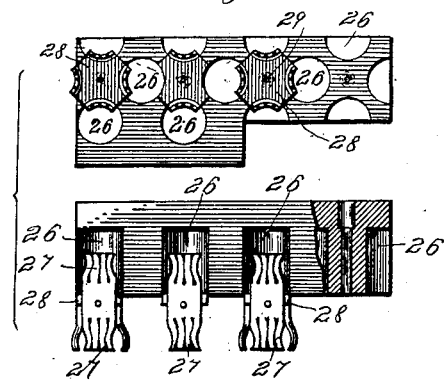
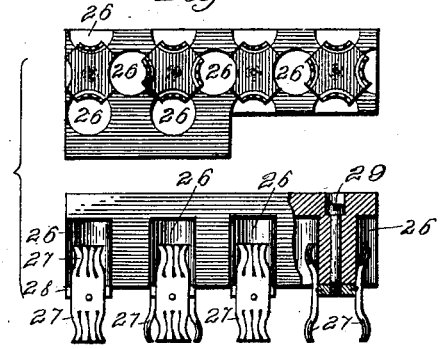
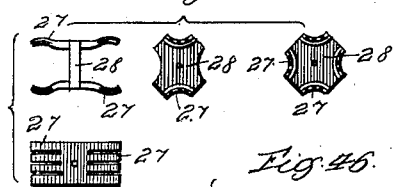
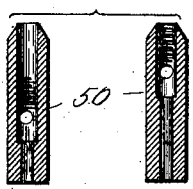
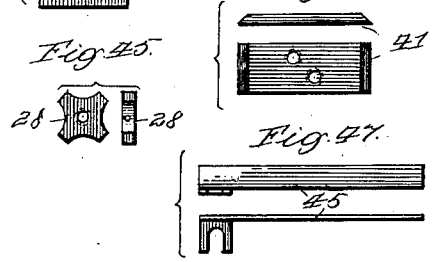
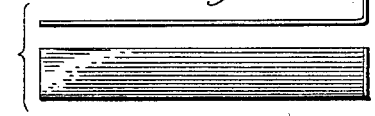
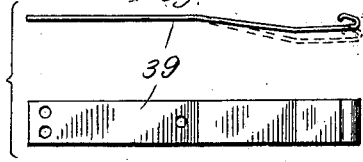
Witnesses
Herbert Bradley
Edward R. Allen
Inventor
Slaughter W. Huff.
By Hervey Knight
Attorney No. 653,087. Patented July 3, 1900.
S. W. HUFF.
ELECTRIC CONTROLLER.
(Application filed July 12, 1898. Renewed June 9, 1900.)
(No Model.) 8 Sheets—Sheet 6.
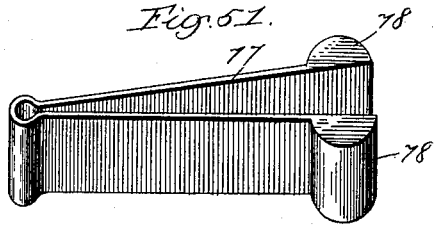
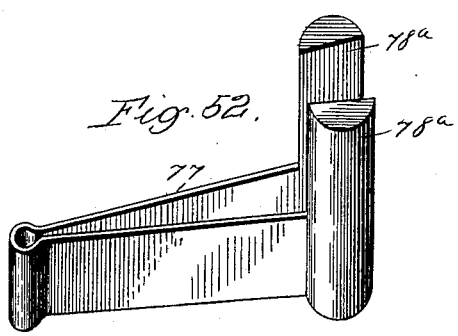
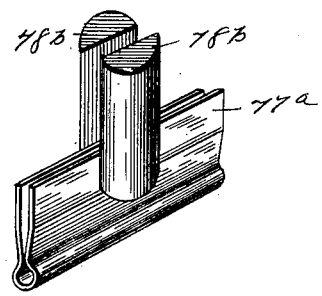
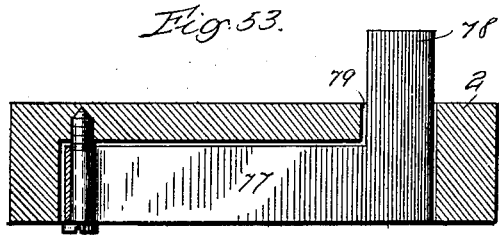
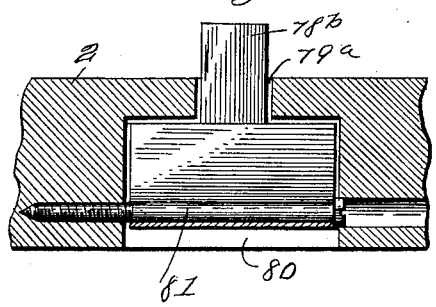
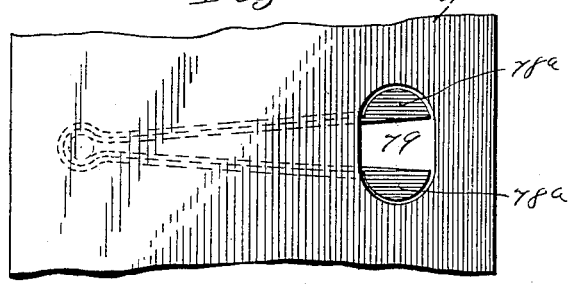
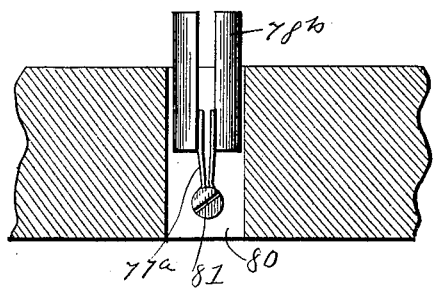
Witnesses
Herbert Bradley.
Edward K. Allen.
Inventor
Slaughter W. Huff.
By Hervey Knight
Attorney
THE NORRIS PETERS CO., PHOTO-LITHO., WASHINGTON, D. C.

No. 653,087.  
Patented July 3, 1900.  
S. W. HUFF.  
ELECTRIC CONTROLLER.  
(Application filed July 12, 1898. Renewed June 9, 1900.)  
(No Model.)  
8 Sheets—Sheet 7.

Fig. 58. Forward Running Steps.

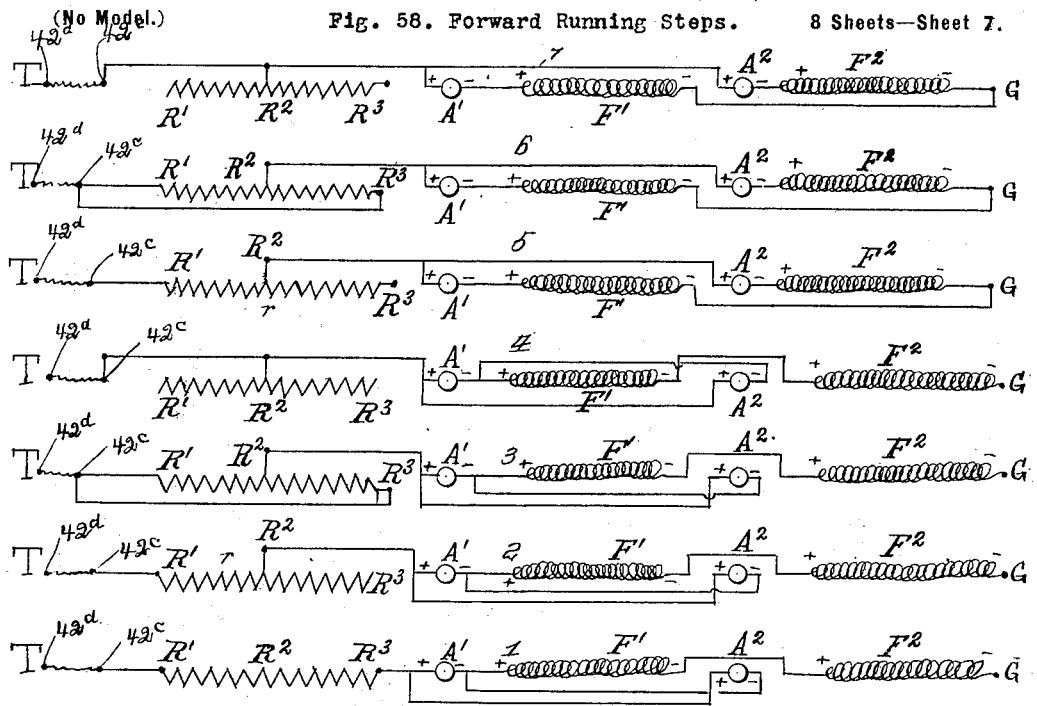

Fig. 59. Steps beyond "Off".  
Normal Braking Effect by closing local circuit. Aux. Switch on $42^a$ & $42^b$

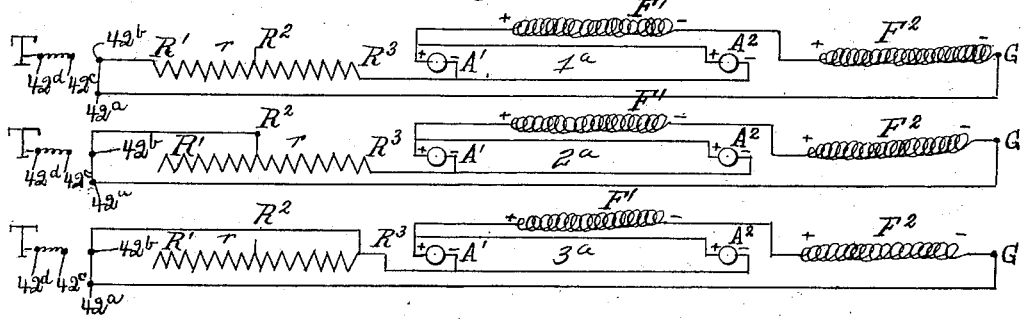

Fig. 60. Steps beyond "Off".  
Changed to Reversing with current by moving Aux. Switch on $42^b$ & $42^c$

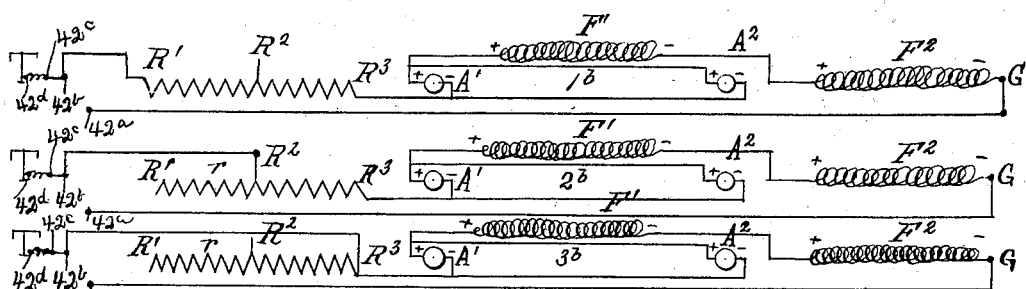

Witnesses  
Herbert Bradley  
Edward K. Allen

Inventor  
Slaughter W. Huff  
By Hervey S. Knight  
Attorney

No. 653,087. Patented July 3, 1900.
S. W. HUFF.
ELECTRIC CONTROLLER.
(Application filed July 12, 1898. Renewed June 9, 1900.)

(No Model.)  8 Sheets—Sheet 8.

UNITED STATES PATENT OFFICE.

SLAUGHTER W. HUFF, OF BALTIMORE, MARYLAND, ASSIGNOR OF ONE-HALF TO JESSE HILLES, OF SAME PLACE.

ELECTRIC CONTROLLER.

SPECIFICATION forming part of Letters Patent No. 653,087, dated July 3, 1900.

Application filed July 12, 1898. Renewed June 9, 1900. Serial No. 19,788. (No model.)

*To all whom it may concern:*

Be it known that I, SLAUGHTER W. HUFF, a citizen of the United States, and a resident of Baltimore, in the State of Maryland, have invented certain new and useful Improvements in Electric Controllers, of which the following is a specification.

My invention relates to the same general type of controllers as that described in United States Letters Patent No. 581,557, granted April 21, 1897—that is to say, a controller comprising two parallel plane bodies carrying, respectively, terminals to which the circuits to be controlled are connected and bridging-contacts which enter between said terminals, the said plane parts being spaced apart by about the height of the overlapping terminals and contacts and the said terminals and contacts being arranged in rows or series, which permits relative movement between the plane parts to bring the contacts successively into the bridging relation with different sets of terminals in order to effect at will the changes in the phases of the working circuits.

One feature of my present invention consists in so arranging the above-mentioned parts that they will have their relative movement in a horizontal direction, thereby permitting the use of the conventional crank-arm for imparting the relative movements to the plane parts and making the controller in this respect similar to other types of controller now in general use, so as to avoid the necessity of training operatives to the use of new movements in controlling the car. Further advantages arising from this change from vertical to horizontal movement of the parts arise from the better opportunity which is afforded to establish controlling connection between the shaft and the carriage, as well as for supporting the weight of the moving part, thus relieving the operating mechanism from a large amount of work to be performed and permitting a more delicate adjustment between the terminals and bridging-contacts.

A further feature of my invention relates to improved means for imparting the reciprocating movement of the crank-handle to opposite ends of the moving part uniformly.

Further features relate to improvements in the construction of various details of the mechanism, to wit: the means for mounting the moving part or carriage in a fixed plane before the stationary part or back, the connection between the operating mechanism of the parts to be operated, and the various means for making the electrical connections, as well as the details of construction in general of the apparatus.

Further features relate to new phases of circuits which are employed to produce new and valuable working effects in the motors, and new arrangements of apparatus whereby these changes in phases may be conveniently effected—such, for instance, as reversing the current through the motors by a continuous backward movement of the operating-handle past the "off" point and the use of various steps at points to which said handle may be used beyond the off point, whereby the phases of the motor-circuits are changed at will in novel ways productive of new results in the control of the car.

A further object is to provide an auxiliary or coöperating switching device whereby the motors may be connected in a closed series circuit to cause them to act as generators in a closed circuit of minimum resistance, and thus impose heavy work upon the car-axles, which impedes the car and produces a braking effect without the usual wear and tear on the brakes.

My invention will be fully understood upon reference to the accompanying drawings, in which—

Figure 1 is a front view of a controller embodying my present improvements and with the front portion of the casing removed to disclose parts in rear thereof. Fig. 2 is a vertical section from front to rear of Fig. 1, taken in the plane of the operating-shaft. Figs. 3, 4, and 5 are plans, respectively, of the top of the controller, working parts beneath said top, and of the bottom plate of the controller. Fig. 6 is a vertical section on the line 6 6, Fig. 5. Figs. 7 and 8 are horizontal sections of Figs. 1 and 2, taken on the lines 7 7 and 8 8, respectively. Fig. 9 is a vertical section of the lower end of the back, taken on the line 9 9, Fig. 1. Fig. 10 represents by face and sectional views the form of the star-wheel carried by the operating-shaft and with which a pawl (to be described) coöperates to hold the shaft at the different points corresponding to steps in the movement of the carriage. Fig. 11 represents the winding-drums carried by the operating-shaft and which receive the winding-tapes connected to the respective sides of the carriage. Fig. 11ª shows by similar views one of a pair of pinions which may be employed instead of the winding-drums. Fig. 12 represents the operating-shaft with the star-wheel and winding-drums secured in proper relation upon it. Fig. 12ª is a similar view showing the pinions substituted for the winding-drums. Figs. 13 and 14 represent by face and end views the construction of the carriage and the detachable means for connecting the winding-tape to it. Figs. 13ª and 14ª are similar views showing the carriage as constructed for control by the pinion on the crank-shaft. Figs. 15 and 16 represent by plan, side, and end views the cleats which are applied to the ends of the back to afford sliding supports for the upper and lower ends of the carriage. Figs. 17 and 18 represent by views corresponding to Figs. 15 and 16 the cleats which are applied to the respective ends of the carriage and through the medium of which said carriage is secured to the cleats on the back. Fig. 19 represents the removable tongue, which enters the opposed grooves of the cleats on the back of the carriage, whereby said cleats are locked against lateral movement relatively, but are left free to have relative longitudinal movement imparted to them. Fig. 20 represents by side view and longitudinal section one of the attaching-plates which have dowel-pin connection with the respective ends of the oppositely-projecting winding-tapes, through the medium of which rotary movement of the operating-shaft is transmitted as a reciprocating movement to the carriage. Fig. 21 is one of the screws employed for the purpose of attaching the stop 20 to the cleat. Figs. 22 and 23 represent the stops which are secured to the lower ends of the carriage for the purpose of arresting its movement by contact with the cut-out blocks to be hereinafter described. Figs. 24 and 25 represent stops which are placed upon the back of the cleats for the purpose of arresting the carriage at the respective limits of its movement. Fig. 26 represents the split bearing by means of which the operating-shaft is secured to the cleats on the back. Fig. 27 represents the roller of the dog or pawl employed for holding the star-wheel in the different steps of its rotation. Fig. 28 represents the fulcrum-pin upon which said pawl or dog is mounted. Fig. 29 represents the locking-lever which engages the auxiliary switch to prevent drawing of the latter except when the carriage is in proper position. Figs. 30 and 31 represent by two different views the construction of the operating-handle. Figs. 32, 33, and 34 represent the construction of the crank of said handle. Fig. 35 represents by two views the construction of the trip-lever and dog which engage the stop on the dial-plate to arrest the controlling-handle at the limits of its ordinary movement and which may be withdrawn from such engagement to permit an extraordinary movement of the controlling-handle beyond the stop for the purpose of introducing extra phases in the working-circuits. Fig. 36 represents the grip of the handle, Fig. 37 the point-indicating collar of said handle, and Fig. 38 the peculiarly-formed stop. Fig. 39 represents the spring which holds the trip-lever of the stop in normal position. Figs. 40 and 41 represent the manner of attaching conductors to terminals upon the back. Figs. 42, 43, 44, and 45 represent the construction of the cut-out blocks and their gripping contacts, which are employed for the purpose of cutting out either motor when desired and short-circuiting it. Figs. 46 to 50 represent further details of parts to be hereinafter described. Figs. 51 to 57 represent novel constructions of bridging-contacts, all of which embody the general idea of having solid segmental or semicylindrical contact ends formed upon or attached to them, Fig. 51 representing by perspective view a simple form for attachment on the surface of the carriage, Figs. 52, 53, and 54 representing by perspective view, by a longitudinal section, and by a plan view, a form in which the spring is countersunk in the carriage and the contact ends project through an opening therein, and Figs. 55, 56, and 57 representing by perspective view, by longitudinal section, and by transverse section, another form wherein the spring or body portion is countersunk and the contacts protrude from the surface. Fig. 58 is a schematic plan illustrating the principal steps in establishing the various phases of the working circuits employed in forward running, the circuits being arranged and numbered upwardly in the order in which they are developed by continuous movement of the carriage from the off point toward the left hand as the controller is viewed in Fig. 1. Fig. 59 is a schema of the circuit phases developed by the movement of the carriage beyond the off point to develop successively three braking steps in which the motors are connected in a closed local circuit on the car when the auxiliary switch is in normal position. Fig. 60 is a schematic view of the reverse running steps beyond the off point corresponding, substantially, to the steps shown in Fig. 59, except that the circuit is connected with the trolley for the purpose of reversing the motors by current from the line, such a connection with the trolley being effected by shifting the auxiliary switch. Fig. 61 is a diagrammatic view of the terminals and wiring carried by the fixed member of the controller and the coöperating bridging-contacts carried by the moving member of the controller, by means of which any of the circuit phases illustrated in Figs. 58, 59, and 60 may be established by simply moving the bridging-contacts into the corresponding pairs of lines numbered 1, 2, 3, 4, 5, 6, or 7, or 1ª, 2ª, 3ª, or, if the auxiliary switch be previously shifted, 1ᵇ, 2ᵇ, or 3ᵇ.

The controller comprises a plane back or support 1, a plane carriage 2, mounted in parallel relation and laterally movable before the back or support 1 in a horizontal direction, a base 3, upon which the back or support is mounted and to which it is secured by a supporting-step 3ª, and a bracket 4, bolted to the back by screws 5. The back or support is provided on the side of its terminals with an upper cleat 6, secured to the back by screws 6ª and having a downwardly-presented horizontal groove 6ᵇ and a lower cleat 7, secured to the back by screws 7ª and having an upwardly-presented groove 7ᵇ. The carriage 2 is provided on its inner face with an upper cleat 8, securely screwed thereto and provided with an upwardly-projecting groove 8ᵇ and with a lower cleat 9, having a downwardly-projecting groove 9ᵇ. The cleats 8 and 9 on the carriage respectively overlap the cleats 6 and 7 on the back and their grooves 8ᵇ and 9ᵇ correspond, respectively, with the grooves 6ᵇ and 7ᵇ, so that tongues 10 may be introduced longitudinally into the said corresponding grooves and secure the carriage against displacement outwardly, while permitting it freedom of horizontal movement edgewise. The position of the grooves 6ᵇ and 7ᵇ in the cleats 6 and 7 is such that the inner face of the carriage 2 will be spaced apart from the opposed face of the back 1 by about the height of the terminals carried by the back and the coöperating bridging-contacts carried by the carriage and projecting between the said contacts. These terminals and contacts are arranged in parallel series just as in my previous patent referred to, except that the channels between them run in a horizontal direction and permit of a corresponding movement of the carriage. One advantage of this arrangement is that it enables me to provide for supporting substantially all of the weight of the carriage upon its sliding bearings, thus avoiding the necessity of using counterbalancing means, reducing the work necessary to be performed by the operator and rendering said work uniform throughout the movement of the carriage. In order to impart reciprocating movement to the carriage in a horizontal direction and uniformly at its opposite ends, I employ a vertical operating-shaft 11, mounted in a channel 11ª in the back 1 and secured by split bearings 12 at its opposite ends, which bearings may be conveniently attached by screws 13 to the backs of the cleats 7, recesses 12ª being formed for this purpose at suitable points in the back 1, as shown in Fig. 7. The shaft 11 is provided near its opposite ends with winding-drums 14, Figs. 1, 2, and 11, provided with slots 14ª, in which may be secured the middle point of a winding-tape 15 or the inner ends of two such winding-tapes 15, as may be most convenient, and these tapes extend in opposite directions for connection to the attaching-plate 16, Figs. 2, 13, and 20, which attaching-plate is provided with dowels 17, which enter sockets 17ª in the cleats 8 and 9, so as to permit the carriage to be brought into driven connection with the attaching-plates 16 by an inward movement before the tongues 10 are introduced, after which movement imparted in either direction to the said attaching-plates will be transmitted to the carriage, while the introduction of the tongues 10, Fig. 2, will prevent the detachment of said plates. In order to hold the attaching-plates 16 in proper position and to insure smoothness of the operation, said attaching-plates are let into grooves formed at corresponding points in the cleats 6 and 7, as shown in Figs. 2 and 16. The manner of attaching the winding-tapes to the attaching-plates will be understood from Figs. 13 and 20. The ends of the tapes are looped around the projections 18 in such a manner that they form a gripping connection. In making this connection the plates may be tilted until the connections are made, and the length of the tape adjusted, so that when the attaching-plates are turned into alinement and introduced into the grooves of cleats 6 and 7 the tapes will be drawn taut, so as to avoid any lost motion. Instead of using the tapes and winding-drums, I may employ racks 9ª, formed on the cleats 9, as shown in Figs. 13ª and 14ª, and pinions 14ª, mounted on the winding-shaft 11, as shown in Figs. 11ª and 12ª, which will intermesh with the racks 9ª and impart uniform reciprocating movement to opposite ends of the carriage by turning the shaft in either direction. With the racks and pinions, however, the attaching-plates 16 will be omitted, and the tongue 10, Fig. 2, will guide the carriage so as to hold its racks in engagement with the pinions.

Whether the drums and winding-tape or the racks and pinions be employed the important advantage is obtained of imparting to the carriage a uniform motion in proportion to all angles of the shaft's rotation, because the peripheries of the drums and of the pinions both serve as driving-peripheries on the shaft, having continuous positive connection with carriage with constant driving effect, whereby the aforesaid advantage is attained.

19 represents stops placed upon fixed cleats 6 and 7, Figs. 1, 2, and 25, and 20 represents arms secured by screws 21 to the lower cleat 9 of the carriage, the lower end of the carriage being cut away to expose said cleat 9 at the ends. The arms 20 project down, so as to come into contact with the stop 19 as the carriage reaches the respective ends of its movement. 22 represents the cut-out blocks, which may be introduced between the terminals 23 and 24 and close brakes in the motor-windings when the motors are left in service, and each of which blocks may be withdrawn from the position shown and set up until its projecting contacts 27 enter the spaces between the upper series of the terminals and cut out the motor controlled by said block. When the block is thus set up, it offers an obstruction to one of the arms 20 of the carriage and limits the movement of said carriage to those terminals on the back or support 1 which are connected up in circuit with the other motor, which is not cut out. The object and effect of this are fully described in my previous patent referred to. The construction of these cut-out blocks will be understood upon reference to Figs. 42 to 45. Each block consists of a wooden or other insulating-block 23, having bored at intervals in it openings 26 at points corresponding in position to the terminals 23 and 24, over which the block is to be placed. The bridging-contacts, which impinge against said terminals when the blocks are in place, consist of resilient flaring brushes 27, grouped about a quadrilateral disk 28 and preferably made double-ended and secured to the disk at their middle points. The group of brushes thus formed is attached to the blocks by having the inner ends enter the bores or depressions 26, while the disks rest upon the solid portions between said bores or depressions and are there secured by screws 29, inserted from the back or other equivalent means. The group of brushes thus formed are reversible in the event of wear or burning, and they form yielding bridging-contacts between each pair of terminals to be connected. The method of attaching the terminals $1^a$ to the back is best shown in Figs. 40 and 50. For this purpose I employ long screws 30, passing through the terminals $1^a$ and into the back 1, preferably with an interposed washer 31, said screws then entering a thimble or sleeve 32, countersunk in the rear face of the back. The thimbles 32 also serve to attach the conducting-wires 33, said wires either being introduced endwise through openings 34 in the sleeves 32, or if they are to be connected at an intermediate point without stripping the wire of its insulation the sleeves 32 are split, as shown in Fig. 41. The conductor is bared at suitable intervals, as shown at 35, and passed through the split end into the eyes 34, after which the thimbles are closed together and introduced into countersunk openings in the back and the screws 30 driven into them in such a manner as to draw the thimbles into place and press the end of the screw firmly against the wire 33.

36 represents an auxiliary switch-rod which extends from the top of the controller through the channel $36^a$ to a recess 37 near the bottom, Fig. 8, and there connects, through an offset 38 and friction-plate 39, with the block 40 of a bridging-contact 41, which bears upon a series of binding-posts or terminals $42^a$, &c., Figs. 1, 2, and 50. These binding-posts or terminals $42^a$, $42^b$, $42^c$, and $42^d$ are connected, respectively, in the various parts of the working circuits, as illustrated in Figs. 58, 59, and 60—that is to say, $42^a$ (referring to Figs. 59 and 60) is a terminal in a conductor leading from the grounded end of the motor-circuits and $42^b$ is a terminal which is connected to the opposite end of the motor-circuits and through which current passes to the motors. Hence if the bridging-contact 41, Fig. 1, rests upon the terminals $42^a$ and $42^b$ there will be a closed circuit through the motors on the car, as shown in the three phases of circuits in Fig. 59. With these connections the motors operate as generators to send the current through the closed circuit, and by the work thus imposed upon them a braking effect is produced on the car which is ample for ordinary stopping purposes or for holding back in running down grades. The braking effect is modified by manipulating the resistance, as illustrated in diagram in Fig. 59, which manipulation of the resistance is effected by movements of the main controller-contacts beyond the off point, as will appear. The terminals $42^c$ and $42^d$ are connected, respectively, with opposite ends of the fuse, as is shown in Fig. 58, so that should an emergency arise requiring the fuse to be cut out or short-circuited it is simply necessary to shift the bridging-contact 41, Fig. 1, until it rests upon the terminals $42^c$ and $42^d$, when the current will be received from the trolley and delivered to the motors independently of the fuse. The switch is used for this purpose on occasions when the fuse blows out.

From the above description it will be seen that still another effect may be produced by the auxiliary switch, as shown in Fig. 60—that is to say, the bridging-contact 41 may be moved upon the terminals $42^b$ and $42^c$, at which time current will be received directly from the trolley through the fuse and supplied to that set of motor-circuits which is employed for reversing the motors with current from the line. It will be observed that the auxiliary switch can have no effect upon any of the circuits which are called into play for ordinary forward running, because the leading-in wire of the reversing or braking circuits is different from that of the forward-running circuits. It must also be borne in mind that those terminals on the main controller which are employed for varying the phases of forward-running circuits are distinct from those similarly employed for the braking and reversing circuits.

The described method of braking the car by employing a closed circuit in which the motors act as generators has great advantage over the ordinary reversing or braking by direct current from the line, in that it saves wear and tear upon the motors, operates much more gradually, and is very much more effective. Besides by changing the resistance of the closed circuit thus employed the braking effect may be controlled at will.

Inasmuch as it would be undesirable to shift the connections until the carriage is first moved to the off point, I provide at the upper end of the switch-rod 36 a locking-lever 43, Figs. 1, 2, and 39, which enters a notch 44 in the rod 36 when the latter is in the normal position. The locking-lever 43 is provided with a spring 45, which tends to hold the lever normally in the notch 44, Fig. 4. The lever is, however, displaced from said notch by movement of the rod 36; but the said lever cannot be displaced and the rod 36 cannot therefore be moved until the notch 47 on the star-wheel is brought opposite the projection on the end of the locking-lever 43, as illustrated in Fig. 4. Inasmuch as the notch 47 comes opposite the projection on the locking-lever 43 only when the controlling-shaft is at the off position, it follows that the auxiliary switch cannot be shifted unless the controller is at the off point.

The star-wheel 46 may be keyed to the shaft 11 in any suitable way and has its notches 46$^a$ so located as to receive the roller 48$^a$ of the pivoted dog 48 and be there held yieldingly. The dog 48 is pivoted on a pin 49, Figs. 1 to 4 and 28, and has a spring 50, bearing at one end upon a fixed screw 51 and at its other end upon the spacing-pin 52, Figs. 1 and 27, with several intermediate turns 53, Fig. 1, around the fulcrum-pin 49. 59 represents the cover of the controller, which is held down by screws 56, projecting outward from the back of the controller and entering downwardly-projecting ears 57 on said cover. Said ears are provided with reduced slots 58, communicating with the openings through which the screws 56 pass, and said screws are provided with reduced necks, so that they may be partly turned out until their reduced necks come opposite the slots 58, when the cover may be lifted from place, the knob 36$^b$ on rod 36 having been previously removed.

The controlling-handle 60 is fitted to the upper end of the operating-shaft 11 and has turning connection therewith through a key 61, which is fixed in the hub 62 of the handle and enters the slot 63 of the shaft 11, Figs. 12 and 31. Beneath the hub 62 is an indicating-collar 64, fixed to the shaft 11 and having the index 65, which designates by pointing to the dial 66 the position of the carriage, and consequently the phases of the motor-circuits.

I have provided in connection with my controller additional terminals having connections which introduce phases of circuits for reversing the motors by a continued return movement of the crank-handle beyond the stop. In order to permit the handle to be thus moved beyond the stop at the will of the operator, the projection 66 on the handle which engages the stop 67 on the dial is made movable by forming it upon the end of a trip-lever 68, which is pivoted at 69 in the handle 60 and has a depressible ring 70 at its upper end which encircles the lower end of the grip 71, so that in the event it is desired to employ the reverse connections it is simply necessary for the operator to slide the hand downward to depress the ring 70, rock the lever 68 upon its pivot 69, and withdraw the projection 66 from the path of the stop 67. The off movement of the handle can then be continued on past the stop to work the additional phases by a continued movement of the carriage in the same direction. This affords many advantages in the operation of the controller and avoids the use of separate reversing connections. To return to the forward connections again, it is not necessary for the operator to continue depression of the trip-lever 68, since the stop 67, as will be best understood from Fig. 38, is formed with compound cam-face which automatically trips the projection 66 and permits the latter to pass the stop 67 when returning to forward movement.

The sheet-metal casing is made in two sections 73 74, of which the former is at the rear and secured along its edges to the bottom and to the back or base board, while the latter section covers the front and is made removable and is secured in place by lap-jointed seams 75 at its respective sides between the front and rear sections and clips 76, which embrace the edges of said lap-seams and bind upon them by being forced down upon the diverging edges of said seams, as shown more clearly in Figs. 51 and 52.

I find in practice that it is convenient to form the bridging-contacts 77, the object and location of which will be obvious from an inspection of Figs. 2 and 13, with solid ends 78 instead of with struck-up ends, as covered by my Letters Patent hereinbefore referred to. This contact device may also be arranged with protruding contact ends 78$^a$, extending above the plane of the spring or body portion, as shown in Fig. 52, thereby adapting the contact for use as illustrated in Figs. 53 and 54, wherein the body portion is countersunk in the carriage 2 or other part upon which it is to be mounted, and the contacts 78$^a$ protrude through an opening 79 and beyond the surface of the mounting. Substantially the same ends may be accomplished by employing a relatively-broader hinging-spring 77$^a$, as shown in Fig. 55, from which the contacts 78$^b$ project, this form of device being adapted for countersinking in the manner illustrated in Figs. 56 and 57, wherein the body portion enters a recess 80 and is secured therein by a screw 81, while the protruding ends 78$^b$ project through an opening 79$^a$ and beyond the surface of the mounting for contact with cooperating terminals.

Referring to Fig. 58, which represents the various circuit phases along the lines of which I prefer to operate motors of an electric vehicle, it will be seen that that first running step commencing with the off point and counting forward is a starting step in which the current passes from trolley connection T through the fuse F and through all the resistance $r$, when it is divided between the armatures $a$ and $a'$ and passes in series through the fields $f$ and $f'$. This step is maintained with increased efficiency by reducing the resistance to one-half, as shown in No. 2, or dividing the current through the resistance, as shown in No. 3, or cutting out all the resistance, as shown in No. 4, in which latter the greater efficiency of the improved series of running step is attained. The advantage of this starting step is that it gives greatly-improved traction effects in that it prevents slipping of the wheels when starting or rounding sharp curves. With the armatures connected in multiple and the fields connected with each other and with both armatures if either pair of wheels tends to slip it cuts current from its own armature and arrests the slipping, but cannot cut out the current of the armature of the other pair of wheels. Hence the wheels pull evenly and I obtain in starting the traction advantages of the full parallel step and the slow speed and mechanical advantage of the series step, as heretofore arranged. The next running step is illustrated by Nos. 5, 6, and 7 and is the ordinary parallel running step with the motors connected in multiple. This step may be modified, as shown, either by delivering the current through one-half the resistance, as shown in No. 5, or dividing it through all the resistance, as shown in No. 6, or for the full running cutting out all the resistance, as shown in No. 7. Running in the opposite direction from the off point downward, which is accomplished by turning the handle backward past the stop 67, Fig. 3, by tripping the latch 66, Fig. 31, we come either to the series of retarding or braking steps $1^a$, $2^a$, and $3^a$, as shown in Fig. 59, or to the series of reversing steps $1^b$, $2^b$, and $3^b$, as shown in Fig. 60. The corresponding steps of these series are alike except that in the series Fig. 59 the points $42^a$ and $42^b$ are connected, whereas in Fig. 60 the points $42^b$ and $42^c$ are connected. It therefore follows that it is only necessary to shift the auxiliary switch 41 so as to connect either the points $42^a$ and $42^b$ or the points $42^b$ and $42^c$, and the remaining changes in both series may be made by identically the same steps in the movement of the carriage of the controller to the right, commencing with the off point.

The series Fig. 59 is employed most frequently, and therefore the auxiliary switch rests upon and bridges the space between the terminals $42^a$ and $42^b$ in its normal position. This causes the motors to act as generators and to impose such a load upon the wheel-axles as to bring the car almost to a stop, so that it can be brought to a complete stop by application of the brake with little wear and tear of the latter, or so that the car may be held back if running down hill. These stops are identical, except that in $1^a$ all the resistance is in, in $2^a$ one-half the resistance is in, and in $3^a$ all the resistance is cut out of the local circuit. This step will ordinarily be sufficient for controlling the car. If for any reason, however—such, for instance, as an emergency—a reversal of the motors by the use of current from the line is required, this may be accomplished by similarly moving the carriage beyond the off point, just as in accomplishing the ordinary braking step, except that the auxiliary switch is first shifted from its normal or lowermost position to the position in which the bridging-contact rests upon the terminals $42^b$ and $42^c$. We thereby develop the circuits illustrated in Nos. $1^b$, $2^b$, and $3^b$, Fig. 60, in each of which the current is reversed through the motors and which steps differ among themselves only in the degree of resistance employed. By comparing Figs. 59 and 60 it will be seen that the circuits $1^a$, $2^a$, and $3^a$ correspond, respectively, with the circuits $1^b$, $2^b$, and $3^b$, except that in the three former circuits the point $42^b$ is connected to the point $42^a$, so as to complete a local circuit through the motors, while in Fig. 60 the point $42^b$ is connected not to the grounding-point, which is the point connected to the discharge end of the motor-circuits, but to the trolley, so as to get current from the line. By referring again to Figs. 1 and 4 it will be seen that the auxiliary switch can only be moved while the crank-handle is at off point. Hence there is no danger of shifting at the wrong time and producing arcing. In these steps for reversing the current from the line it will be observed that I have likewise employed the parallel-series arrangement, which produces the same advantageous result with regard to preventing the slipping of the wheels as described with reference to the forward-running steps numbered 1 to 4.

In order to facilitate wiring of the fixed member of the controller for the purpose of bringing out the circuit phases schematically illustrated in Figs. 58, 59, and 60, a diagram of the terminals on said fixed member and the wiring connected therewith is presented in Fig. 61, along with the two sets of bridging-contacts 17, which are mounted in fixed relation upon the moving member of the controller, as shown in Fig. 13, and move simultaneously with every movement of the carriage in a horizontal direction in the channels formed between the terminals.

The bridging-contacts 17 are shown in the off position, and it will be understood that to produce any circuit phase designated by the numbers 1 2 3, &c., or $1^a$, $2^a$, and $3^a$, &c., in Figs 58, 59, or 60 it is simply necessary to move the bridging-contacts 17 in Fig. 61 into the positions between the terminals designated by dotted lines numbered 1 2 3, &c., or $1^a$, $2^a$, and $3^a$ in Fig. 61, which correspond to notches on the controller. The phases illustrated in Fig. 60 are made by the same movements of the carriage that produce the phases of Fig. 59, (it being seen that the armature and fields are in the same relation in both figures;) but in addition to moving the carriage it is necessary to shift the contact 41 onto the terminals $42^b$ and $42^c$, so as to send the current from the line through the motors (armatures reversed) instead of having a closed circuit on the car.

It will be seen that the dotted lines indicating positions of the contacts only extend to points where the electrical connection is made. In tracing the circuits given in Figs. 58, 59, or 60 it is simply necessary to find the point on the diagram Fig. 61 at which the circuit shown in Figs. 58, 59, and 60 begins, then trace from said point over the line leading therefrom to a point in a vertical dotted line numbered to correspond with the number given in the schematic figure to the circuit which it is desired to trace. For example, if it be desired to trace on Fig. 61 the novel starting-circuit numbered 1 in Fig. 58 where the current passes from the trolley at the point $42^d$ through the fuse to the point $42^c$, thence through all the resistance, thence through both armatures in multiple, and thence through the fields in series to ground, we find point $42^c$ at the right-hand side of Fig. 61, which we see is connected through the fuse and terminal $42^d$ with the trolley, and we trace from $42^c$ over wire $c'$, wire $c^2$, to the elongated terminal marked $T'$, thence through the dotted line representing the bridging-contact to the corresponding elongated terminal marked $R'$, ($R'$ indicating that the terminal is connected to one of the resistance,) thence over wire $c^3$ to the binding-post $R'$, thence over wire $W^8$ to the point $R'$ of the resistance $r$, thence through the entire length of the resistance, (corresponding to the showing in circuit 1, Fig. 58,) thence over wire $W^{10}$ to the binding-post $R^3$, thence over wire $c^4$ to the contact-terminal $R^{3\prime}$, which we find in the dotted line 1, thence through the series of terminals in said dotted line 1 to a connecting-terminal Y, thence over the wire $c^5$ to the connecting-terminal Y' in the right-hand dotted line 1, thence over the last-named dotted line 1 down to a contact-plate marked $A+1$, (designating a terminal of the positive pole of armature $A'$.) Here the current divides, part going through wire $c^6$ to cut-out post 23 of $A+1$ and thence through block 22, post 24, and wire $W'$ to armature $A'$, and the remainder of the current going by continuation of dotted line 1 to a contact-plate marked $A+2$, (indicating the positive pole of armature $A^2$,) thence over the wire $c^7$ to cut-out posts 23 of $A+2$ and through contact-block 22, post 24, and over wire $W^3$ to the plus pole of armature $A^2$. From both the armatures $A'$ and $A^2$, which are thus connected in multiple, the current passes over the negative wires $W^2$ and $W^4$ and their respective posts 24, blocks 22, and posts 23 to the positive pole of field $F'$, where the current is again united—that is to say, from $A-1$, post 23, through wire $c^8$ to elongated contact $A-1$—thence through the dotted line 1 to elongated contact-plate marked $F+1$, also from $A-2$, post 23, through wire $c^9$ to the elongated contact $A-2$, thence through dotted line 1 to the same contact $F+1$, to which the current was just traced from armature $A'$. From this point the united current passes through wire $c^{10}$, $F+1$, post 23, block 22, post 24, and wire $W^5$ to the plus side of field $F'$, thence from the negative side of field $F'$ through wire $W^6$, post 24, block 22, and $F-1$, post 23, wire $c^{11}$, and terminal pin $F-1$ to elongated terminal $F-1$, thence over dotted line 1 to elongated terminal $F+2$, thence through wire $c^{12}$ to $F+2$, post 23, block 22, post 24, and wire $W^7$ to field $F^2$, whence the current escapes to ground. It will thus be seen that a through-circuit is obtained in which the armatures are connected in multiple with the field in series and all the resistance in circuit.

Since the terminals employed for making the connections just described have sufficient lateral extent, except as to the connecting resistance-point $R'$, it follows that the carriage may be shifted into phase-line 2 without breaking said connections except that of $R'$, and by so doing terminal $R^2$ will be connected with $A+1$ and half the resistance cut out in the new starting step.

While I describe the new parallel-series starting step as being established by the particular type of controller herein shown, I do not limit myself thus, for said circuit may be established by suitable arrangement of other types of controllers.

In the same manner as above described by commencing at the point where the current is brought in and following the connecting-wiring therefrom until a terminal is reached intersecting with a phase-line corresponding with the number of the circuit to be traced any desired circuit may be traced at will.

Let us take for another example the circuit numbered 7 in Fig. 58, where all the resistance is cut out and the two motors are connected in full multiple. Commencing with the point $42^c$, through which current is fed from the trolley, we follow the wire leading therefrom until it reaches a terminal intersected by one of the phase-lines 7. This we find takes us over the wires $c'$, $c^2$, and $c^{13}$ to terminal $T^2$. Following the dotted phase-line 7 we find $T^2$ or trolley connected to $A+1$ or the positive pole of one of the armatures, said terminal $A+1$ being connected to armature $A+1$ through wires $c^{14}$, $c^6$, $A+1$ cut-out post 23, &c.; but we also find that the current divides as it reaches the wire $c^{14}$ and part goes by wire $c^{15}$ past terminals $A+1$ and $R^2$ by bridging-contact in phase-line 7, through wire $c^{16}$ to binding-post $R^2$, thence by wire $c^{17}$ to elongated terminal $R^2$, through bridging-contact in dotted phase-line 7 to corresponding terminal $A+2$, through wire $c^{18}$ to $A+2$ cut-out post 23, and thence to armature $A^2$. From the respective armatures the current passes through the corresponding fields to ground—that is to say, from armature $A'$, through $W^2$, cut-out 24 22 23 wire $c^8$, terminals $A-1$ and $F+1$, and wire $c^{10}$ to $F+1$ post 23, &c., through field $F'$, thence from F−1 post 23, through wires $c^{11}$ and $c^{19}$, terminals F−1 and G, and wire $c^{20}$ to binding-post G, also from armature $A^2$, through wire $W^4$, cut-out 24 22 23 wire $c^9$, wire $c^{21}$, terminals A−2 and F+2 wire $c^{12}$, and F+2 cut-out, to field $F^2$, and thence to ground.

From the foregoing it is seen that every end terminal of a series of terminals on the fixed member of the controller is marked according to the part of a motor or of the resistance to which it is wired. Therefore it is not necessary in tracing circuits to follow the wiring, but simply to observe the connections effected between the terminals by moving the bridging-contacts into the different phase-lines. For example, the carriage is moved back beyond "off" till the contacts occupy the line $1^a$. It is at once seen that by the left-hand series of bridging-contacts 17 both A+1 and A+2 are connected to F+1, F−1 is connected to F−2, F−2 being normally connected to ground, both A−1 and A−2 are connected to $R^3$, and the opposite end of the resistance R' is connected through fourteen double breaks with a terminal Z, while by the right-hand series of bridging-contacts a terminal Z', joined by wire $c^{22}$ to Z, is connected through a series of sixteen double breaks to a terminal Tr, which is in turn connected by wire $c^{23}$, contact $42^b$, and switch 41 to grounding connection $42^a$. Hence we have the condition shown in phase $1^a$, Fig. 59—namely, a closed circuit on the car in which the armatures are reversed and the resistance is in, which is recognized as the special braking step. Had the switch 41 been drawn up to bridge $42^b$ and $42^c$ previous to shifting the carriage into the line $1^a$, the local circuit would be broken, the negative end of field $F^2$ would have retained its normal connection with ground, and the trolley connection $42^c$ would be sent over wire $c^{23}$ and trolley reverse terminal Tr through the circuit $1^b$, and we would have reversing by current from trolley. By further shifting the carriage into the line $2^a$ it will be seen that by reason of the dimensions of the left-hand group of terminals in the lines $1^a$, &c., representing the poles of the motor elements and the third resistance-point, the connections existing between these parts remain unbroken, while the two lines of upper pins break connection between Tr and R', and instead of this connection the lower right-hand contacts connect Tr with $R^2$, and the current only goes through half the resistance. By moving the carriage to line $3^a$ the lower right-hand portion of contacts go out of play, and those above Tr connect said terminal with $R^3$, with which the armatures are likewise connected, and all resistance is removed. In each instance when cutting out resistance a plurality of breaks are employed, and these breaks vary in number according to the severity of arcing to be overcome.

Having thus described my invention, the following is what I claim as new therein and desire to secure by Letters Patent:

1. In an electric controller, the combination of a plane back, a plane carriage parallel to the back and supported vertically upon the sliding bearing in front of said back, said parts carrying terminals and bridging-contacts, and a shaft lying transversely to the path of travel of the carriage and having connections with the ends of said carriage whereby uniform movement is imparted to the latter; said shaft having means for rotating it; substantially as explained.

2. In an electric controller, the combination with a suitable back and a carriage movable horizontally in front thereof, the one carrying electric terminals and the other carrying contacts bearing against said terminals, a shaft mounted at an intermediate point between the carriage and back and extending transversely to the movement of the carriage, and connections between the ends of said shaft and the carriage, imparting to the carriage a uniform motion at all angles of rotation of the shaft, to bring the contacts successively upon different terminals.

3. In an electric controller, the combination with the plane back and sliding plane carriage moving thereon, carrying, the one electric terminals and the other bridging-contacts, the shaft extending transversely to the movement of the carriage, located between the carriage and back at an intermediate point in the travel of the carriage and having driving-peripheries, and positive connections between the driving-peripheries and the carriage, transmitting from the former to the latter uniform movement at all angles of revolution of the shaft, to bring the contacts successively upon different terminals.

4. In an electric controller, the combination of a back, cleats upon the back near its ends, a carriage having cleats upon its face overlapping those of the back, means for securing the cleats in sliding relation, and means for moving the carriage; substantially as set forth.

5. In an electric controller, the combination of the back and the carriage, having overlapping cleats, with opposed grooves in the adjacent faces of said cleats, removable tongues inserted in the opposed grooves for securing the carriage in sliding relation to the back, and means for imparting movement to the carriage; substantially as and for the purposes set forth.

6. In a controller, the combination of the back and carriage, the cleats secured to one of said parts and affording means for connecting them in sliding relation and spacing them apart, terminals and contacts secured to the respective parts and overlapping in the space between the parts, and the strips 10 secured to one of the parts and closing the ends of the space between them; substantially as and for the purposes set forth.

7. In a controller, the combination of the back, the carriage mounted in sliding relation in front of the back, a shaft mounted longitudinally on said back, and winding connections on the shaft connected to the respective sides of the carriage for imparting movement to it in opposite directions; substantially as set forth.

8. In a controller, the combination of the back, the carriage mounted in sliding relation to the back, a controlling-shaft, winding-drums fixed upon said shaft, and tapes or bands wound in opposite directions upon said drum and secured to the respective sides of the carriage for reciprocating the latter as the shaft is rotated in opposite directions; substantially as explained.

9. In a controller, the combination of the back, the carriage mounted in sliding relation to the back, the shaft, an attaching-plate connected to said shaft through the medium of winding connections, and a detachable connection between the attaching-plate and the carriage; substantially as and for the purposes set forth.

10. In a controller, the combination of the back, the shaft mounted in said back, winding connections extending from said shaft, an attaching-plate to the ends of which said winding connections are attached, and a carriage having dowel-pin connection with said attaching-plate, through the medium of which the plate may move the carriage while the carriage is permitted to be moved out of engagement with the attaching-plate; substantially as explained.

11. In a controller, the combination of the back, the carriage, the cleats secured to the carriage, through the medium of which said carriage has sliding connection with the back, projections 20 secured to one of said cleats, and a stop 19 provided on the back; substantially as and for the purposes set forth.

12. In a controller, the combination of the back, the carriage, the cleats secured to the back and affording sliding bearings for the carriage, and a shaft mounted in a depression in the back, having reciprocating connections with the carriage, and having bearings secured to the rear sides of the cleats upon the back; substantially as and for the purposes set forth.

13. In an electric controller, the combination of terminals $42^a$, $42^b$, bridging-contact 41, controlling-rod 36, and locking-lever 43 engaging said rod 36 to prevent its movement, and circuit-controlling connections having operating mechanism which controls said locking-lever, whereby the latter engages the rod 36 only under certain conditions of said circuit-controlling connections; substantially as and for the purposes set forth.

14. In a controller, the combination of a suitable mounting, circuit-terminals, bridging-contact 41, block 40, connecting-spring 39, offset 38, engaging a shoulder on the mounting, and controlling-rod 36, arranged and operating substantially in the manner and for the purpose set forth.

15. In a controller, the combination of the terminals and the bridging-contact, the controlling-rod 36 provided with notch 44, the locking-lever 43, the circuit-controlling mechanism with means for operating it, including the star-wheel against which a locking-lever is caused to bear; said star-wheel being formed to admit the locking-lever when the controlling mechanism is at the "off" point and to release the controlling-rod at such time only, substantially in the manner and for the purposes set forth.

16. In an electric controller, the combination of relatively-moving parts carrying terminals and bridging-contacts, a ratchet device for marking the successive steps of the moving part, a controlling-handle for moving one of said parts relatively to the other, a stop and projection mounted respectively upon a fixed part of the controller in position to arrest the handle at the "off" point and upon the handle, and means for withdrawing one of said parts out of the path of the other to permit a continued movement of the handle beyond the stop; substantially as set forth.

17. In an electric controller, the combination of two relatively-movable parts respectively carrying terminals and bridging-contacts, of which some of the terminals are connected in normal running circuits and others are connected in abnormal circuits, a handle controlling the movements of one of the parts relatively to the other, a stop for arresting the movement of the handle at a point which leaves the contacts intermediate of the normal and abnormal terminals, a movable projection on the handle through the medium of which the stop arrests the handle, and having means for withdrawing it from the path of the stop to permit movement of the handle beyond the limits of the normal movement; said stop being provided with cam-faces on one side whereby it automatically displaces the projection on the handle on the return movement of the latter; substantially as and for the purposes set forth.

18. In combination with an electric controller arranged for making both forward and reversing circuits, a rotary handle controlling the said circuits by movement over the same dial in opposite directions, a stop for arresting the movement of the handle at a common off point in either direction, which leaves the contacts intermediate of the forward and reversing terminals, a movable projection on the handle through the medium of which the stop arrests the handle, and having means for withdrawing it from the path of the stop to permit movement of the handle beyond the limits of the forward movement; substantially as described.

19. In combination with an electric controller having connections for establishing forward and reverse running connections, a controlling-shaft establishing different phases of the forward circuits by a revolution of the shaft in one direction, and establishing the phases of the reverse-running circuits by a revolution over the same path in the opposite direction; substantially as herein explained.

20. In combination with an electric controller having connections for establishing forward and reverse running connections, a shaft having connections with the moving part of the controller which establish the phases of the forward-running connections by a revolution of the shaft in one direction, and the phases of the reverse-running connections by a revolution of the shaft over the same path in the opposite direction, and a star-wheel and ratchet for marking the steps in the revolution of the shaft in both directions and thereby serving in common for the forward as well as the rear running operation of the controller.

21. In combination with a controller having forward and rear running connections, a shaft having connections for actuating the moving part of the controller in both directions by revolutions over the same path in opposite directions, a star-wheel and pawl serving in common to indicate the steps of revolution of the shaft in both directions, an arresting-stop in the path of the handle of said shaft and positively-operated means for releasing the handle from engagement by the stop; substantially as herein explained.

22. A controlling-handle carrying a trip-lever pivoted to the handle and terminating in a ring surrounding the grip of the handle whereby the hand of the operator may be pressed upon said ring to operate the trip-lever without releasing the grip; substantially as set forth.

23. In a controller, the combination of a back or mounting 1, a terminal 1ª, screw 30, thimble 32 introduced from the side of the back or mounting opposite to the terminal, and conductor 33 passing through the thimble 32 and impinged by the screw 30; substantially as and for the purposes set forth.

24. The combination of the mounting 1, the terminal 1ª, screw 30, split thimble 32 having eye 34, an insulated conductor 33 bared at points 35 and introduced through the opening of the thimble into the eye 34; said thimble being countersunk in the mounting 1 and having threaded into it the screw 30 impinging conductor 33; substantially as and for the purposes set forth.

25. In combination with an insulated conductor; a split sleeve or binding-post 32 formed with an eye 34 for the passage of the conductor, and a threaded screw-socket intersected by the plane of its split opening; substantially as and for the purposes set forth.

26. A binding-post or thimble formed with a transverse eye and a longitudinal screw-socket, and split from one end to the transverse eye; substantially as explained and for the purpose set forth.

27. The combination of the contact-block 25 having countersinks or bores 26, and the bridging-contacts consisting of disks 28 secured to the block at points between the countersinks or bores, and brushes 27 secured at intermediate points to said disks and having their inner ends in the bores with their outer ends projecting for contact with terminals which enter the bores; substantially as and for the purposes set forth.

28. The herein-described bridging-contact, comprising the hinging-spring and the solid segmental enlargements on the ends of the leaves of said spring; substantially as and for the purposes set forth.

29. The herein-described bridging-contact, comprising the hinging-spring and the solid segmental enlargements on the ends of the leaves of said spring, and protruding lengthwise beyond the edges thereof; substantially as and for the purposes set forth.

30. In combination with a recessed mounting, a bridging spring-contact working in the recess and having protruding contact ends; substantially as set forth.

31. In combination with a recessed mounting, a bridging-contact countersunk therein and having protruding contact ends extending through the mounting and beyond the surface thereof opposite the recess; substantially as set forth.

32. In combination with the motors of an electrically-propelled vehicle; electrical connections for establishing the various phases of circuits including said motors, a controller for shifting the connections with the various circuits; the initial or starting circuit being arranged to connect the armatures of the motors in multiple, and the fields in series with both armatures, substantially as herein explained and for the purpose set forth.

33. In combination with the motors of an electrically-propelled vehicle; a series of circuits of varying phases of which the first or starting circuit connects the armatures in multiple, and the fields in series with each other and with both armatures, for the purpose set forth.

SLAUGHTER W. HUFF.

Witnesses:
HERVEY S. KNIGHT,
WALTER ALLEN.